United States Patent
Stein

(10) Patent No.: US 10,034,061 B2
(45) Date of Patent: Jul. 24, 2018

(54) AUTOMATIC CUSTOM SETTINGS FOR AN AUDIO-VIDEO DEVICE

(71) Applicant: THOMSON LICENSING, Issy les Moulineaux (FR)

(72) Inventor: Alan Jay Stein, Princeton Junction, NJ (US)

(73) Assignee: THOMSON Licensing, Issy-les-Moulineaux (FR)

( * ) Notice: Subject to any disclaimer, the term of this patent is extended or adjusted under 35 U.S.C. 154(b) by 0 days.

(21) Appl. No.: 15/034,614

(22) PCT Filed: Nov. 8, 2013

(86) PCT No.: PCT/US2013/069052
§ 371 (c)(1),
(2) Date: May 5, 2016

(87) PCT Pub. No.: WO2015/069267
PCT Pub. Date: May 14, 2015

(65) Prior Publication Data
US 2016/0316275 A1  Oct. 27, 2016

(51) Int. Cl.
*H04N 21/6547* (2011.01)
*H04N 21/434* (2011.01)
*H04N 21/485* (2011.01)
*H04N 21/431* (2011.01)
(Continued)

(52) U.S. Cl.
CPC ....... *H04N 21/6547* (2013.01); *H04N 21/431* (2013.01); *H04N 21/4345* (2013.01); *H04N 21/4532* (2013.01); *H04N 21/485* (2013.01); *H04N 21/84* (2013.01)

(58) Field of Classification Search
None
See application file for complete search history.

(56) References Cited

U.S. PATENT DOCUMENTS

2004/0255150 A1* 12/2004 Sezan ................. H04L 12/2803
  726/27
2010/0013996 A1*  1/2010 Kang ..................... H04N 5/445
  348/553

(Continued)

FOREIGN PATENT DOCUMENTS

EP          2395750         12/2011

*Primary Examiner* — Hoang Vu A Nguyen Ba
(74) *Attorney, Agent, or Firm* — Brian J. Dorini; Lily Neff

(57) ABSTRACT

A method and system are performed by a processor of an audio-visual device according to instructions stored in a memory of that device that determines identity of a content medium based upon attributes associated with it and a set of user-defined settings associated with the content medium. The processor identifies a set of source-defined settings for configuring the device and selects one set of user-defined settings or the set of source-defined settings for configuring the audio-visual device. In addition, the processor determines if preexisting attributes exist that if it has to override the set of user-defined settings. It then configures one of the set of user-defined or overrides the settings. All channels from a particular network provider utilize the same set of user-defined settings, including channels that have not been visited by a user and future channels that have not yet been created.

14 Claims, 1 Drawing Sheet

(51) Int. Cl.
*H04N 21/84* (2011.01)
*H04N 21/45* (2011.01)

(56) References Cited

U.S. PATENT DOCUMENTS

2010/0188586 A1 7/2010 Tsubouchi
2012/0326834 A1 12/2012 Kennedy et al.

\* cited by examiner

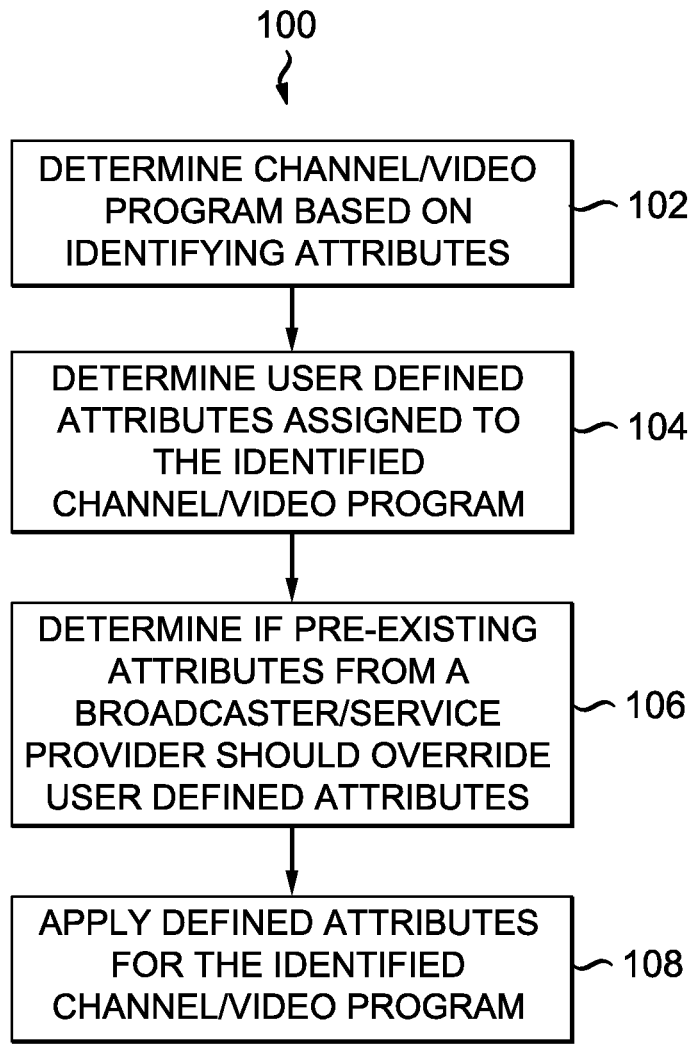

AUTOMATIC CUSTOM SETTINGS FOR AN AUDIO-VIDEO DEVICE

CROSS-REFERENCE TO RELATED APPLICATIONS

This application claims the benefit, under 35 U.S.C. § 365 of International Application PCT/US2013/069052, filed 8 Nov. 2013, which was published in accordance with PCT Article 21(2) on 14 May 2015 in English.

BACKGROUND

With the advent of digital recording and playback, along with streaming content delivery from wired and wireless services, audio and video content can come from a variety of different sources and be played on a variety of different devices. However, the devices on which such content is played usually have differing specifications and varying levels of reproduction quality. In addition, for certain immobile devices, such as televisions and desktop computers, the environment in which such devices reside can affect the sound and visual aspects of the content being reproduced as the listener/viewer experiences it. The sources of such content typically do not account for these varying levels when they transmit their content, leaving such considerations to the user to adjust as he or she sees fit. This can lead to constant adjustment of the reproduction quality of content by the user of such audio-visual devices as the user changes the content being reproduced from one item to another.

SUMMARY

In view of the foregoing background, a method of automatically implementing customized settings for an audio-visual device regarding a particular video program or channel is disclosed. The method includes determining an identity of a content medium based upon identifying attributes associated with the content medium; identifying a set of user-defined settings for configuring the audio-visual device, the set of user-defined settings associated with the content medium; identifying a set of source-defined settings for configuring the audio-visual device, the set of source-defined settings associated with the content-medium; selecting one of the set of user-defined settings and the set of source-defined settings for configuring the audio-visual device; and configuring the audio-visual device in accordance with the selected one of the set of user-defined settings and the set of source-defined settings.

Also disclosed is a system for automatically implementing customized settings for an audio-visual device regarding a particular video program or channel. The system includes the audio-visual device, a (non-volatile) memory, and a processor configured to determine an identity of a content medium based upon attributes associated with the content medium; identify a set of user-defined settings for configuring the audio-visual device, the set of user-defined settings associated with the content medium; identify a set of source-defined settings for configuring the audio-visual device, the set of source-defined settings associated with the content-medium; select one of the set of user-defined settings and the set of source-defined settings to use for configuring the audio-visual device; and configure the audio-visual device in accordance with the selected one of the set of user-defined settings and the set of source-defined settings.

DRAWINGS

For a more complete understanding of the present invention, reference is made to the following detailed description of an embodiment considered in conjunction with the accompanying drawings, in which:

FIG. 1 is a flow chart showing a method in accordance with an embodiment of the present invention.

DESCRIPTION

The present disclosure generally relates to a system and method for customizing settings on an audio-visual device. More particularly, the system provides a user with an ability to set specific settings on the audio-visual device that depend upon the medium or service to which the device is attuned, or the content being displayed/rendered thereon. Such settings include, but are not limited to, audio settings, color settings, closed caption settings, brightness and contrast settings, and trick play settings. Such settings can be customized and triggered based upon which channel is selected, what genre of audio or video program is playing, specific audio or video program is playing, or other such medium or content selection options. In one embodiment, the present system utilizes a front end interface, such as a graphical user interface, to allow a user to designate such settings for each particular channel, program, or genre.

It should be understood that the elements shown in the FIGURE may be implemented in various forms of hardware, software or combinations thereof. Preferably, these elements are implemented in a combination of hardware and software on one or more appropriately programmed general-purpose devices, which may include a processor, memory and input/output interfaces. Other elements can be implemented through the use of specifically-purposed devices, such as electronic display screens and audio-visual devices.

In one embodiment of the present invention, a user selects a particular channel or group of channels for settings customization. In the case of a group of channels, this group can be arranged according to the users selection of channels to belong in the group, or it can be an automatic categorization based on a predefined criterion of each channel in the group. Once the channel or group of channels has been selected, the user assigns a specific audio volume level and/or dynamic range extents thereto, whenever such a channel is selected by and displayed on the audio-visual device. The purpose is to ensure that whenever the user selects a channel from the group of channels for viewing, the system responds by adjusting the volume levels of the audio-visual device to the assigned volume range. This setting can apply to real time delivery of such a channel or when a channel is received in a time-shifted manner, such as when recorded on a digital video recorder ("DVR").

In another embodiment, a user selects a specific audio/video program or genre of programming and assigns an audio volume level thereto for whenever that program is displayed on a display device. For example, in one embodiment, a user assigns a volume level of X to one genre of programming, such as situational comedies, and assigns a volume level of Y to another genre of programming, such as sports-entertainment programs. Thereafter, whenever the user tunes to one of a situational comedy or a sports-entertainment program, the system can automatically respond by adjusting the volume level to X or Y, depending upon which genre of programming is selected. In other embodiments, a user can assign a volume level to particular programs and have the system make corresponding adjustments when such programs are displayed.

In one embodiment, a user also designates settings for fast-forward and reverse for different types of channels or video programs that are recorded on a DVR system. In this embodiment, the user specifies particular intervals for fast-forward and reverse functions, as well as "jump points" for moving forward or backward in a program's timeline, for a particular program, channel, or program genre. For example, for a televised sporting event, a user can set the interval for fast-forward or reverse to be two seconds, while jump points are set at sixty (60) seconds in either forward or reverse. This means that as the DVR system travels forward or backward through a program's timeline when the user selects either fast-forward or reverse, respectively, the audio-visual device will display a frame from each two second interval of the program that is proximate to the audio-visual device's position in the timeline of the program. This also means that when a user decides to "jump forward" or "jump back" during the program, the audio-visual device will "jump" to the next proximate frame at a sixty-second interval. These intervals and jump points can be set from the reference point of the beginning of the program or from the position in the program at which the audio-visual device is playing.

In another embodiment, a video program is pre-indexed with jump points where different scenes take place in the program. For example, for a program that is a televised baseball game, the beginning of each plate appearance by a batter in the game can be indexed as a jump point, where a user can jump from plate appearance to plate appearance by selecting the "jump" operation on the system. Such indexing can be performed by a playback device itself, a service provider, a broadcaster, or other such entity. When such pre-indexed jump points are available, the system allows for the pre-indexed jump point settings to override the settings selected by the user. In one embodiment, the user is notified when such pre-existing jump points exist with respect to a selected program.

In one embodiment, a user interface is used to globally select a group of channels or programs for the setting of attributes for a channel or video program. In one embodiment, attributes are assigned to a major channel number such that all of the sub-channels with that major channel number have commonly defined attributes. In another embodiment, a user can specify that all channels from a particular network provider utilize the same user defined settings, including channels that the user has not visited and future channels that have not yet been created. Other examples are possible in accordance with the principles described above.

Turning now to FIG. 1, it shows a method 100 of implementing a setting customizing system in accordance with an embodiment. At the outset, the system performs a check of the program selected on the audio-visual device to determine the identity of the program, the identity of the channel on which the program is playing, and/or genre with which the program is associated (step 102). The system can identify the particular program, channel and/or genre based on identifying attributes of the program, such as those found in a channel guide and/or an electronic program guide ("EPG") commonly transmitted with the program. In other embodiments, programs, channels, and/or genres are identified via the metadata and/or watermarks embedded therein.

Once the identifying attributes have been determined, the system performs a check to verify whether the user has previously set any specific settings for the particular program, channel, and/or genre (step 104). The system then checks for whether the broadcaster, service provider, or other such entity providing the selected program has defined settings and/or attributes for the program/channel/genre which can be used to override the settings selections made by the user (step 106). Once such checks and determinations have been made, the system applies the selected settings, whether they be from the user or the service provider, to the audio-visual device playing the selected program (step 108).

The various embodiments disclosed herein can be implemented as hardware, firmware, software, or any combination thereof. Moreover, the software is preferably implemented as an application program tangibly embodied on a program storage unit or computer readable medium. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

All examples and conditional language recited herein are intended for pedagogical purposes to aid the reader in understanding the principles of the invention and the concepts contributed by the inventor to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

It will be understood that the embodiments described herein are merely exemplary and that a person skilled in the art may make many variations and modifications. All such variations and modifications are intended to be included within the scope of the invention as defined in the appended claims.

The invention claimed is:

1. A method, comprising:
   determining, by a processor of the audio-visual device according to instructions stored in a memory of the audio-visual device, an identity of a content medium based upon attributes associated with the content medium;
   identifying, by the processor of the audio-visual device according to the instructions stored in the memory of the audio-visual device, a set of user-defined settings for configuring the audio-visual device, the set of user-defined settings associated with the content medium;
   identifying, by the processor of the audio-visual device according to the instructions stored in the memory of the audio-visual device, a set of source-defined settings for configuring the audio-visual device, the set of source-defined settings associated with the content medium;
   selecting, by the processor of the audio-visual device according to the instructions stored in the memory of the audio-visual device, one of the set of user-defined settings or the set of source-defined settings for configuring the audio-visual device;

determining by the processor of the audio-visual device if preexisting attributes exist that has to override the set of user-defined settings;

configuring, by the processor of the audio-visual device according to the instructions stored in the memory of the audio-visual device, the audio-visual device in accordance with the selected one of the set of user-defined or said over-riding settings and the set of source-defined settings; and wherein all channels from a particular network provider utilize the same set of user-defined settings, including channels that have not been visited by a user of the audio-visual device and future channels that have not yet been created.

2. The method of claim 1, wherein the content medium is selected from the group consisting of a broadcast channel, a video program and a genre of video programs.

3. The method of claim 1, wherein the set of user-defined settings includes at least one of volume controls, color settings, closed caption settings, brightness settings, fast-forward and reverse intervals and jump points.

4. The method of claim 1, wherein the attributes are selected from a group consisting of a watermark, an electronic program guide and embedded metadata.

5. The method of claim 1, further comprising storing the set of user-defined settings on a memory.

6. A system comprising an audio-visual device, a memory, and a processor, the processor being configured to:

determine an identity of a content medium based upon attributes associated with the content medium;

identify a set of user-defined settings for configuring the audio-visual device, the set of user-defined settings associated with the content medium;

identify a set of source-defined settings for configuring the audio-visual device, the set of source-defined settings associated with the content-medium;

select one of the set of user-defined settings or the set of source-defined settings for configuring the audio-visual device;

determine if preexisting attributes exist that has to override the set of user-defined settings;

configure the audio-visual device in accordance with the chosen one of the set of user-defined or said over-riding settings and the set of source-defined settings; and wherein all channels from a particular network provider utilize the same set of user-defined settings, including channels that have not been visited by a user of the audio-visual device and future channels that have not yet been created.

7. The system of claim 6, wherein the processor is further configured to store the set of user-defined settings on the memory.

8. The system of claim 6, wherein the content medium is selected from the group consisting of a broadcast channel, a video program and a genre of video programs.

9. The system of claim 6, wherein the set of user-defined settings include at least one of volume controls, color settings, closed caption settings, brightness settings, fast-forward and reverse intervals and jump points.

10. The system of claim 6, wherein the attributes are selected from a group consisting of a watermark, a channel or program guide and embedded metadata.

11. The method of claim 1, wherein the overriding attributes are provided by a service provider.

12. The method of claim 1, wherein the overriding attributes are provided by a broadcasting computer.

13. The systems of claim 6, wherein the overriding attributes are provided by a service provider.

14. The system of claim 6, wherein the overriding attributes are provided by a broadcasting computer.

* * * * *